(12) United States Patent
Littlefield et al.

(10) Patent No.: US 10,557,536 B2
(45) Date of Patent: Feb. 11, 2020

(54) MULTI-AXIS FINAL DRIVE ASSEMBLY

(71) Applicant: GM GLOBAL TECHNOLOGY OPERATIONS LLC, Detroit, MI (US)

(72) Inventors: Joseph R. Littlefield, Sterling Heights, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 16/018,541

(22) Filed: Jun. 26, 2018

(65) Prior Publication Data

US 2018/0299000 A1 Oct. 18, 2018

Related U.S. Application Data

(62) Division of application No. 15/334,333, filed on Oct. 26, 2016, now Pat. No. 10,036,458.

(51) Int. Cl.
| | |
|---|---|
| *F16H 37/08* | (2006.01) |
| *B60K 1/00* | (2006.01) |
| *B60K 6/40* | (2007.10) |
| *B60K 6/48* | (2007.10) |
| *B60K 6/52* | (2007.10) |

(52) U.S. Cl.
CPC .......... *F16H 37/0813* (2013.01); *B60K 1/00* (2013.01); *B60K 6/40* (2013.01); *B60K 6/48* (2013.01); *B60K 6/52* (2013.01); *F16H 37/082* (2013.01); *B60K 2001/001* (2013.01); *B60K 2006/4833* (2013.01); *B60Y 2200/92* (2013.01); *B60Y 2400/73* (2013.01); *B60Y 2400/80* (2013.01); *B60Y 2400/82* (2013.01); *Y02T 10/6221* (2013.01); *Y02T 10/6265* (2013.01); *Y10S 903/911* (2013.01); *Y10S 903/916* (2013.01); *Y10S 903/951* (2013.01)

(58) Field of Classification Search
None
See application file for complete search history.

(56) References Cited

U.S. PATENT DOCUMENTS

| | | | |
|---|---|---|---|
| 4,998,591 A | 3/1991 | Zaunberger | |
| 2012/0295750 A1* | 11/2012 | Fickel | F16H 3/54 475/150 |
| 2013/0123058 A1* | 5/2013 | Markl | F16H 48/06 475/150 |
| 2018/0178646 A1* | 6/2018 | Negri | B60K 17/16 |

* cited by examiner

*Primary Examiner* — Timothy Hannon
(74) *Attorney, Agent, or Firm* — Quinn IP Law

(57) ABSTRACT

A final drive assembly for a vehicle drive axle having first and second axle-shafts that are configured to rotate about a common first axis. The final drive assembly includes a first gear-set configured to be operatively connected to the first axle-shaft. The final drive assembly also includes a second gear-set configured to be operatively connected to the second axle-shaft. The final drive assembly additionally includes an electric motor configured to provide an electric motor torque input to each of the first and second gear-sets and arranged on a second axis that is parallel to the first axis.

6 Claims, 4 Drawing Sheets

MULTI-AXIS FINAL DRIVE ASSEMBLY

CROSS-REFERENCE TO RELATED APPLICATION(S)

This application is a divisional application of U.S. patent application Ser. No. 15/334,333 filed on Oct. 26, 2016, the entire contents of which are hereby incorporated by reference.

INTRODUCTION

The disclosure relates to a multiple-axis final drive assembly that employs an electric motor to drive a pair of opposite side wheels in a vehicle.

Modern motor vehicles are typically configured as either two- or all-wheel-drive. Either type of a vehicle may employ a conventional powertrain, where a single engine is used to propel the vehicle, an electric powertrain, where an electric motor is used to propel the vehicle, or a hybrid powertrain, where two or more distinct power sources, such as an internal combustion engine and an electric motor, are used to accomplish the same task.

An all-wheel-drive hybrid vehicle may be configured as an axle-split vehicle. In such a vehicle, independent power-sources, such as an internal combustion engine and an electric motor, are set up to independently power individual vehicle axles that are operatively connected to the respective power-sources, thus generating on-demand all-wheel-drive propulsion. In such an axle-split hybrid vehicle employing an engine and an electric motor, the electric motor may be capable of propelling the vehicle via the respective axle while the engine is shut off.

Each powered axle typically includes a final drive assembly with a differential that allows opposite side, i.e., left and right side, driven wheels to rotate at different speeds when the vehicle negotiates a turn. Specifically, the differential permits the driven wheel that is traveling around the outside of the turning curve to roll farther and faster than the driven wheel traveling around the inside of the turning curve, while approximately equal torque is applied to each of the driven wheels. An increase in the speed of one driven wheel is balanced by a decrease in the speed of the other driven wheel, while the average speed of the two driven wheels equals the input rotational speed of the drive shaft connecting the power-source to the differential.

SUMMARY

A final drive assembly for a vehicle drive axle has first and second axle-shafts that are configured to rotate about a common first axis. The final drive assembly includes a first gear-set configured to be operatively connected to the first axle-shaft. The final drive assembly also includes a second gear-set configured to be operatively connected to the second axle-shaft. The final drive assembly additionally includes an electric motor configured to provide an electric motor torque input to each of the first and second gear-sets and arranged on a second axis that is parallel to the first axis.

The final drive assembly may also include a first differential shaft operatively connected to the first gear-set and a second differential shaft operatively connected to the second gear-set. The final drive assembly may additionally include a third, differential gear-set operatively connecting the electric motor to the first and second differential shafts.

In the embodiment of the final drive assembly having the differential gear-set, each of the first and second gear-sets may be configured as a parallel-shaft transfer or reduction gear-set. The first parallel-shaft transfer gear-set may be operatively connected to the first differential shaft, while the second parallel-shaft transfer gear-set may be operatively connected to the second differential shaft. Each of the first and second parallel-shaft transfer gear-sets may include a respective first and second intermediate gears arranged to rotate about a third axis that is parallel to each of the first and second axes. Alternatively, each of the first and second gear-sets may be configured as a planetary or epicyclic gear-set configured to rotate about the first axis and having first, second, and third members. The first planetary gear-set may be operatively connected to the first differential shaft and the second planetary gear-set may be operatively connected to the second differential shaft.

Each of the first and second gear-sets may also be configured as a planetary gear-set that rotate about the first axis in the final drive assembly configured without the above differential gear-set. The final drive assembly may also include a final drive housing. In such a case, the electric motor may include a stator fixed to the final drive housing, a rotor, and an outer shaft fixed to the rotor for rotation therewith. The outer shaft may be in mesh with each of the third member of the first planetary gear-set and the third member of the second planetary gear-set.

The final drive assembly may additionally include an inner shaft extending through the outer shaft, in mesh with the first member of the first planetary gear-set, and operatively connected to the first member of the second planetary gear-set.

The inner shaft may be operatively connected to the first member of the second planetary gear-set via an idler gear. In such a case, the idler gear is configured to reverse a direction of rotation of the first member of the second planetary gear-set relative to a direction of rotation of the inner shaft.

The final drive assembly may additionally include an actuator configured to selectively disconnect the inner shaft from one of the first and second planetary gear-sets.

The first axle-shaft may be continuously connected to the second member of the first planetary gear-set and the second axle-shaft may be continuously connected to the second member of the second planetary gear-set.

In each of the first and second gear-sets, the first member may be a ring gear, the second member may be a planetary carrier supporting a plurality of pinion gears in mesh with the first and second members, while the third member may be a sun gear.

A vehicle drive axle for being mounted in a motor vehicle and employing such a final drive assembly is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
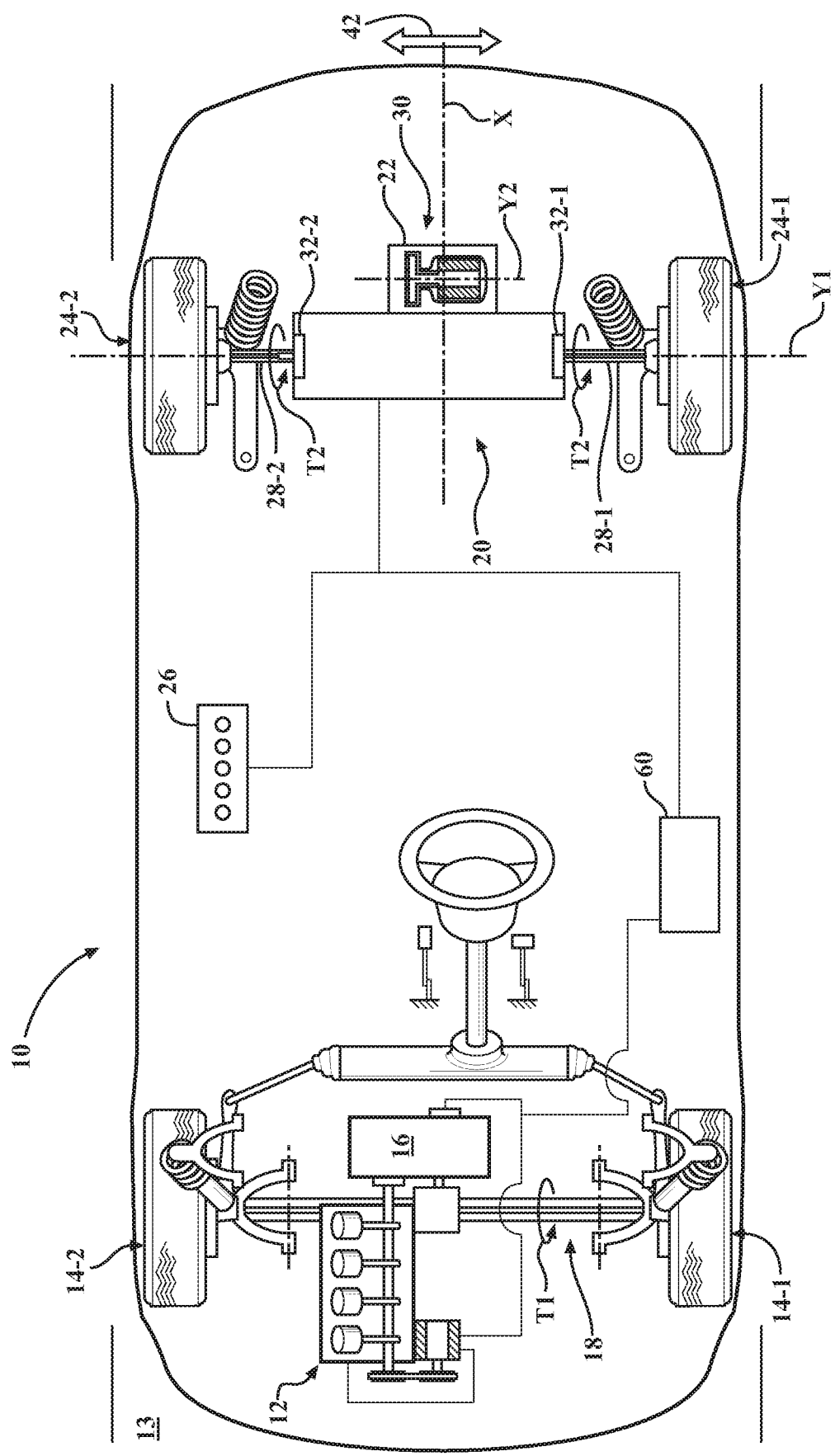
FIG. 1 is a schematic illustration of a vehicle employing a hybrid electric powertrain that includes an internal combustion engine operatively connected to a first axle and a second axle employing a final drive assembly incorporating an electric motor, according to the disclosure.

Referring to the drawings in which like elements are identified with identical numerals throughout, FIG. 1 illustrates a vehicle 10 that uses an electric motor, to be discussed in greater detail below, to drive a pair of opposite, a left and a right, side wheels. As shown, the vehicle 10 is hybrid vehicle having independent first and second power-sources that are operatively connected to respective sets of driven wheels in order to provide on-demand all-wheel-drive propulsion. The vehicle 10 may include, but not be limited to, a commercial vehicle, industrial vehicle, passenger vehicle, train or the like. As shown, the vehicle 10 is generally arranged along a longitudinal vehicle axis X. The vehicle 10 includes a first power-source shown as an internal combustion engine 12 configured to drive the vehicle via a first set of wheels, which includes a first or left-side wheel 14-1 and a second or right-side wheel 14-2, for transmitting engine output or drive torque T1 to a road surface 13 through a transmission assembly 16 and a first axle 18.

The vehicle 10 additionally includes a second axle 20. The second axle 20 is operatively independent from the engine 12 and the transmission 16. The second axle 20 includes an electric motor-generator 22 that is configured to drive the vehicle 10 via a second set of wheels, which includes a first or left-side road wheel 24-1 and a second or right-side road wheel 24-2. The electric motor-generator 22 receives its electrical energy from an energy storage device 26. As understood by those skilled in the art, the motor-generator 22 includes a stator 22-1 and a rotor 22-2 configured to impart a motor-generator output or drive torque T2. According to the present disclosure, the electric motor-generator 22 is configured to drive the vehicle 10 via the drive torque T2 independently from the engine 12 and provides the vehicle 10 with an on-demand electric axle drive. The vehicle 10 may be driven solely via the electric motor-generator 22, i.e., in a purely electric vehicle or "EV" mode. On the other hand, when both first and second axles 18, 20 are driven by the respective engine 12 and the electric motor-generator 22, the vehicle 10 is endowed with all-wheel-drive.

The second axle 20 includes a first axle-shaft 28-1 operatively connected to the left-side road wheel 24-1 and a second axle-shaft 28-2 operatively connected to the left-side road wheel 24-1. Each of the first and second axle-shafts 28-1, 28-2 is configured to rotate about a common first axis Y1. As may be seen, the first axis Y1 is arranged generally perpendicular to the longitudinal vehicle axis X. The second axle 20 also includes a final drive assembly 30 configured to transmit the drive torque T2 to the first and second axle-shafts 28-1, 28-2. The final drive assembly 30 also includes a first gear-set 32-1 operatively connected to the first axle-shaft 28-1. The final drive assembly 30 additionally includes a second gear-set 32-2 operatively connected to the second axle-shaft 28-2. The motor-generator 22, being part of the final drive assembly 30 is configured to provide the drive torque T2 input to each of the first and second gear-sets 32-1, 32-2. The motor-generator 22 is arranged on a second axis Y2 that is parallel to the first axis Y1.

Figure 2:
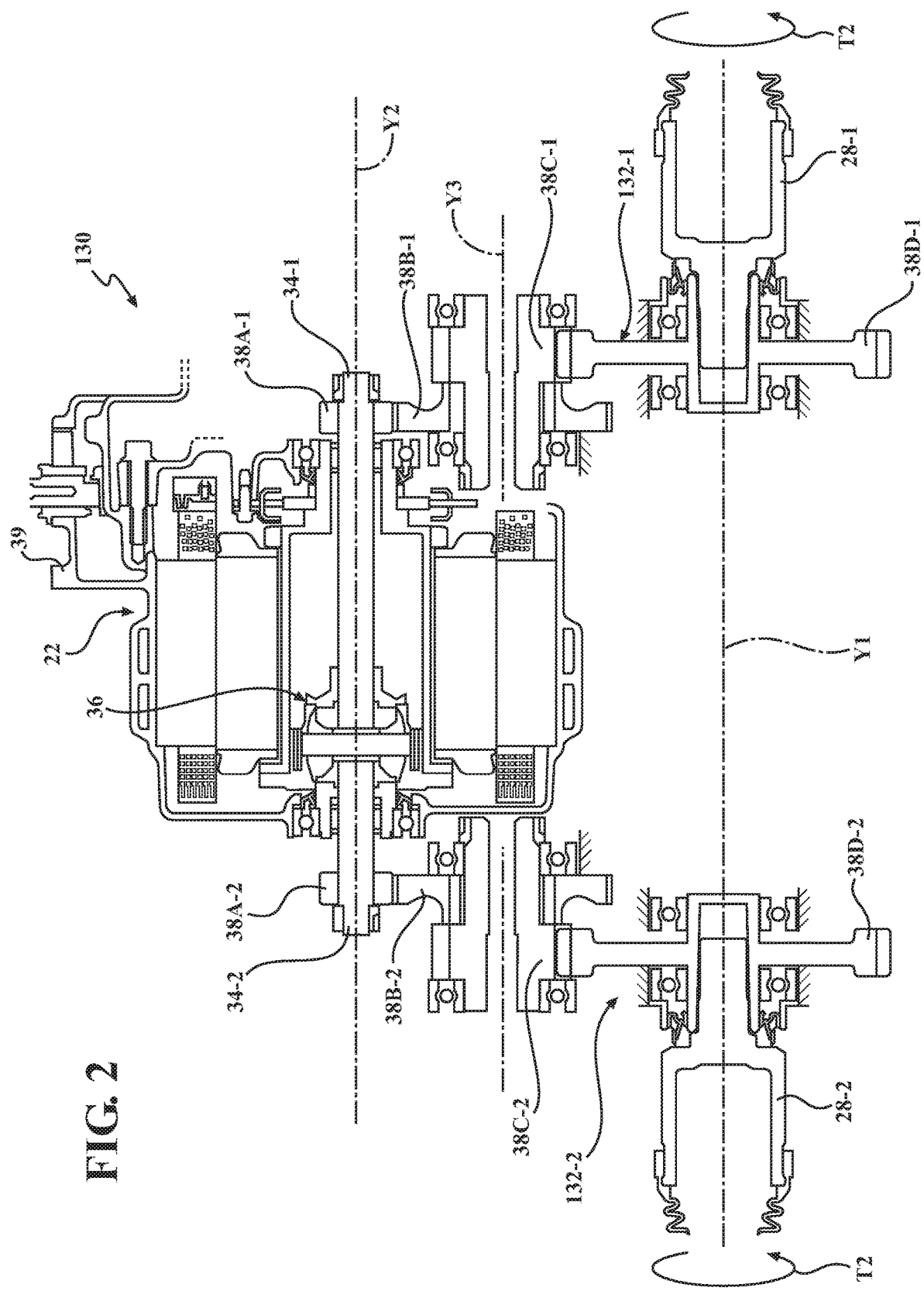
FIG. 2 is a schematic close-up cross-sectional plan view one embodiment of the final drive assembly shown in FIG. 1.

FIG. 2 illustrates a final drive assembly 130, which is a specific embodiment of the final drive assembly 30 shown in FIG. 1. The final drive assembly 130 may include a first differential shaft 34-1 operatively connected to the first gear-set 132-1 and a second differential shaft 34-2 operatively connected to the second gear-set 132-2. In the embodiment of FIG. 2, the final drive assembly 130 may also include a third gear-set 36 configured as a differential. The differential gear-set 36 operatively connects the electric motor 22 to the first and second differential shafts 34-1, 34-2. Furthermore, as shown in the final drive assembly 130, each of the first and second gear-sets 132-1, 132-2 may be configured as a parallel-shaft transfer or reduction gear-set. The first parallel-shaft transfer gear-set 132-1 may be operatively connected to the first differential shaft 34-1, while the second parallel-shaft transfer gear-set 132-2 may be operatively connected to the second differential shaft 34-2.

As shown in FIG. 2, each of the first and second differential shafts 34-1, 34-2 includes respective splined ends or attached gears 38A-1, 38A-2. Each of the first and second parallel-shaft transfer gear-sets 132-1, 132-2 includes respective first and second intermediate gears 38B-1, 38B-2 arranged to rotate about a third axis Y3 that is parallel to each of the first and second axes Y1, Y2. The first and second intermediate gears 38B-1, 38B-2 are continuously connected to gears 38C-1, 38C-2. The first and second intermediate gears 38B-1, 38B-2 transfer torque from the respective first and second differential shafts 34-1, 34-2 to the first and second axle-shafts 28-1, 28-2 via respective axle gear members 38D-1 and 38D-2.

Figure 3:
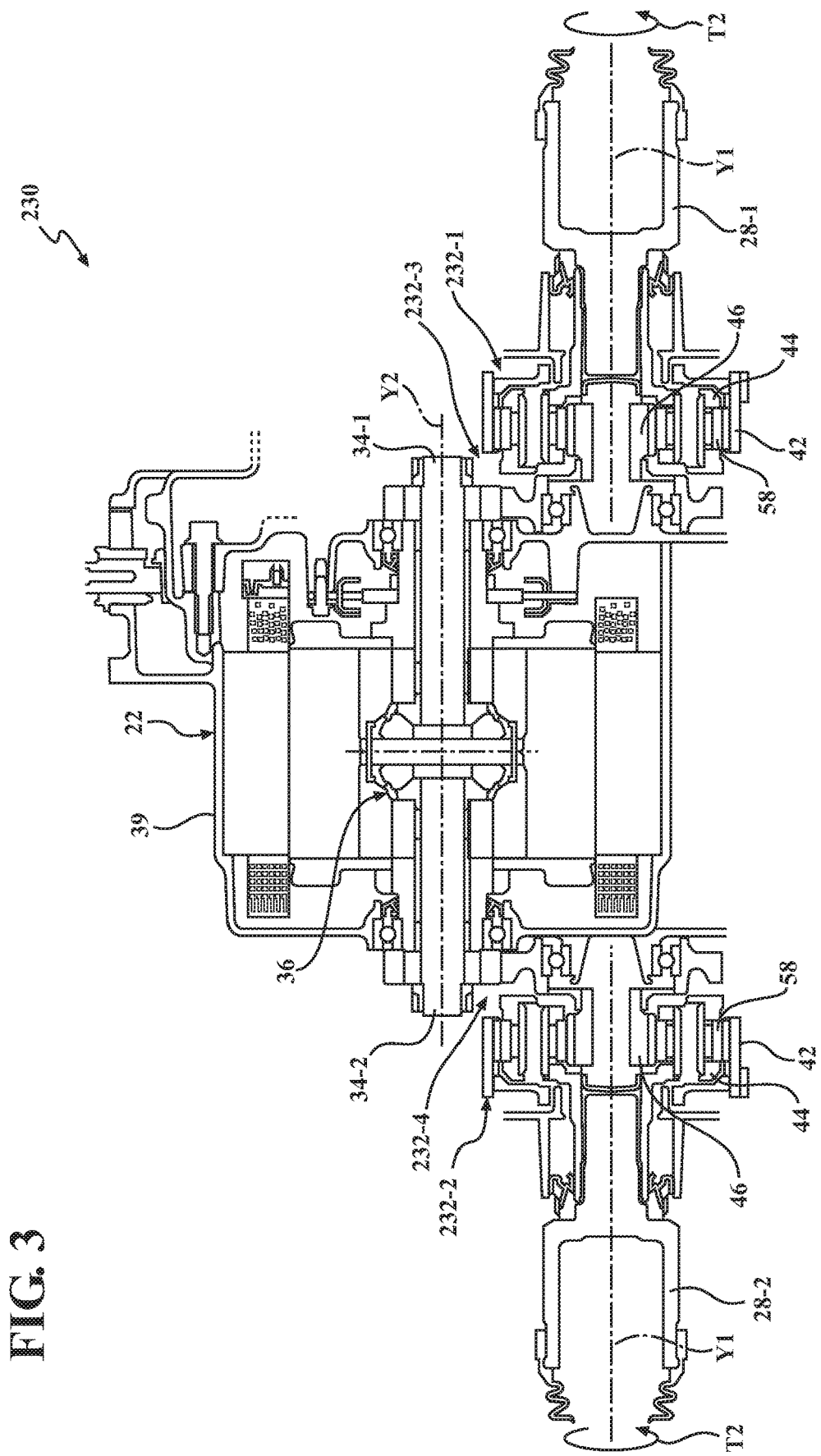
FIG. 3 is a schematic close-up cross-sectional plan view another embodiment of the final drive assembly shown in FIG. 1.

FIG. 3 illustrates a final drive assembly 230, which is another specific embodiment of the final drive assembly 30 shown in FIG. 1. The final drive assembly 230 is similarly configured to transmit the drive torque T2 to the first and second axle-shafts 28-1, 28-2. The final drive assembly 230 includes first and second gear-sets 232-1, 232-2 that, like the respective first gear-sets 232-1, 232-2, are operatively connected to the first and second axle-shafts 28-1, 28-2. Also similar to the previously discussed final drive assembly 130 of FIG. 2, in the final drive assembly 230, the motor-generator 22 arranged on the second axis Y2 is configured to provide the drive torque T2 input to each of the first and second gear-sets 232-1, 232-2. As shown in FIG. 3, each of the first and second gear-sets 232-1, 232-2 in the final drive assembly 230 having the differential gear-set 36 may be configured as a planetary or epicyclic gear-set. As shown, each of the first and second planetary gear-sets 232-1, 232-2 is configured to rotate about the first axis Y1 and have first, second, and third members 42, 44, and 46, respectively.

The first planetary gear-set 232-1 is operatively connected to the first differential shaft 34-1 and the second planetary gear-set 232-2 is operatively connected to the second differential shaft 34-2. Specifically, the first differential shaft 34-1 is in mesh with the third member 46 of the first planetary gear-set 232-1 via a third parallel-shaft transfer gear-set 232-3, and the second differential shaft 34-2 is in mesh with the third member 46 of the second planetary gear-set 232-2 via a fourth parallel-shaft transfer gear-set 232-4. Additionally, the first axle-shaft 28-1 is continuously connected, i.e., for simultaneous rotation without interruption of the connection or the resultant transmission of torque, to the second member 44 of the first planetary gear-set 232-1, while the second axle-shaft 28-2 is continuously connected to the second member 44 of the second planetary gear-set 232-2. In each of the first and second gear-sets 232-1, 232-2, the first member 42 may be a ring gear, the second member 44 may be a planetary carrier supporting a plurality of pinion gears 58 in mesh with the first and second members, and the third member 46 may be a sun gear, as understood by those skilled in the art.

Figure 4:
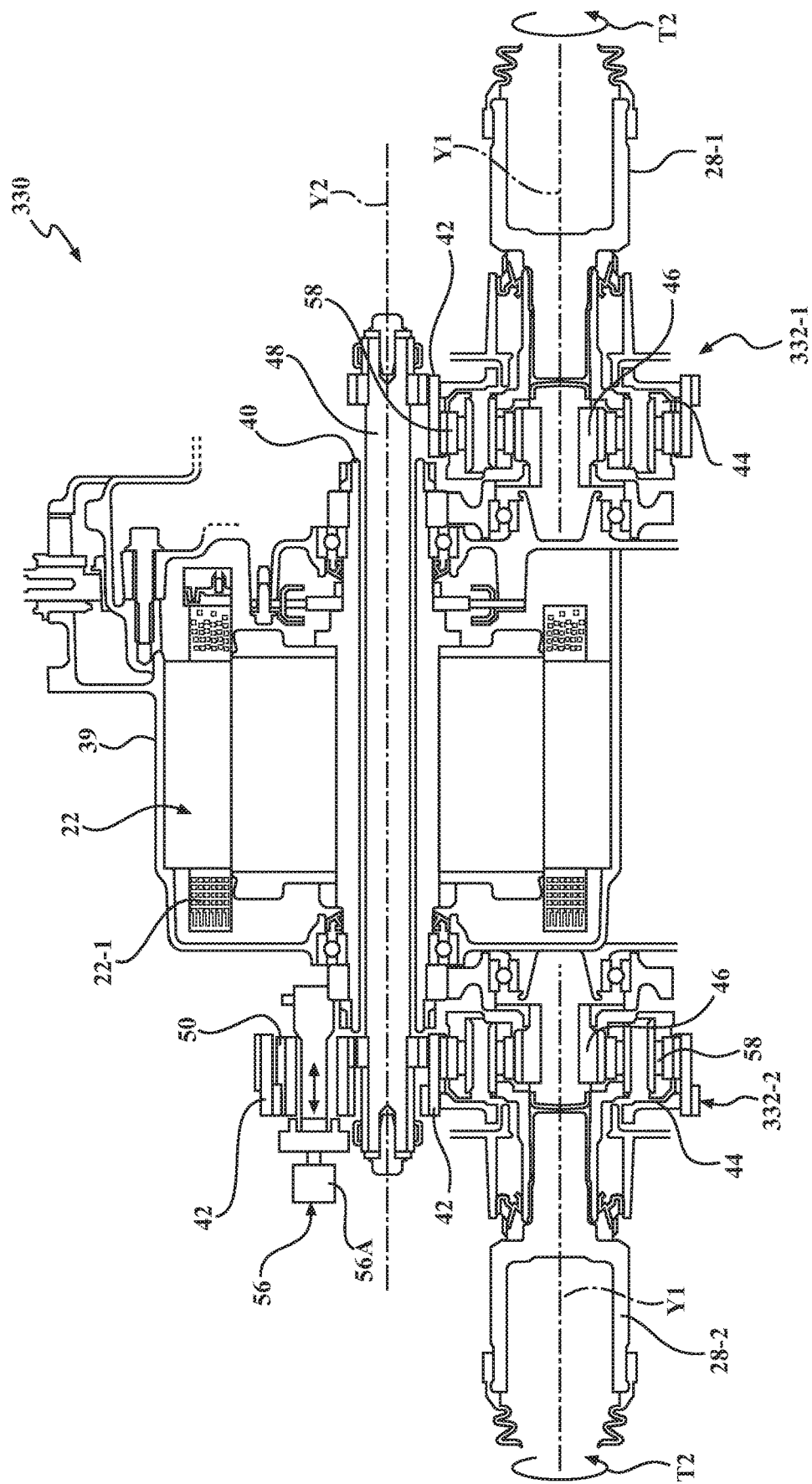
FIG. 4 is a schematic close-up cross-sectional plan view yet another embodiment of the final drive assembly shown in FIG. 1.

According to a separate embodiment shown in FIG. 4, a final drive assembly 330 is disclosed that is similar to the final drive assembly embodiments 130 and 230 in being configured to transmit the drive torque T2 to the first and second axle-shafts 28-1, 28-2. The final drive assembly 330 includes first and second gear-sets 332-1, 332-2 that, similarly to the respective first gear-sets 332-1, 332-2, are operatively connected to the first and second axle-shafts 28-1, 28-2. Also analogous to the previously discussed embodiments of FIGS. 2 and 3, the motor-generator 22 arranged on the second axis Y2 is configured to provide the drive torque T2 input to each of the first and second gear-sets 332-1, 332-2. The final drive assembly 330 is characterized by an absence of a separate and distinct differential gear-set 36, such as used by the embodiments of FIGS. 2 and 3. The embodiment of FIG. 4 utilizes differential rotation of a member of each of the first and second gear-sets 332-1, 332-2 to allow the first and second axle-shafts 28-1, 28-2 to rotate at different speeds, while each of the first and second gear-sets receives the drive torque T2.

Each embodiment of the contemplated embodiments of the final drive assembly 30, i.e., final drive assemblies 130, 230, and 330, may generally include a final drive case or housing 39 configured to enclose various components disclosed and described herein. In the final drive assembly 330 shown in FIG. 4 the stator 22-1 of the motor-generator 22 is fixed to the final drive housing 39. The motor-generator 22 also includes an outer shaft 40 fixed to the rotor 22-2 for rotation therewith. In the final drive assembly 330, similar to the final drive assembly 230 embodiment shown in FIG. 3, each of the first and second gear-sets 332-1, 332-2 is configured as a planetary gear-set, configured to rotate about the first axis Y1. Similar to the embodiment illustrated in FIG. 3, each of the first and second gear-sets 332-1, 332-2 have first, second, and third members 42, 44, and 46, respectively. The outer shaft 40 is in mesh with each of the third member 46 of the first planetary gear-set 332-1 and the third member of the second planetary gear-set 332-2.

As shown in FIG. 4, the final drive assembly 330 also includes an inner shaft 48 extending through the outer shaft 40. The inner shaft 48 is in mesh with the first member 42 of the first planetary gear-set 332-1, and is also operatively connected to the first member 332-1 of the second planetary gear-set 332-2. Specifically, the inner shaft 48 may be operatively connected to the first member 42 of the second planetary gear-set 332-2 via an idler gear 50 configured to reverse direction of rotation 52 of the first member of the second planetary gear-set relative to a direction of rotation 54 of the inner shaft 48.

When the inner shaft 48 and the idler gear 50 are so connected and configured, and the first member 42 of the first planetary gear-set 332-1 is rotating, the second planetary gear-set 332-2 rotates in the opposite direction. Rotation of the first member 42 of each of the planetary gear-sets 332-1, 332-2 changes the speed of rotation of the axle shafts 28-1, 28-2, and allows them to rotate at different speeds. The final drive assembly 330 may include an actuator 56 configured to selectively modify the operation of the inner shaft 48 and idler gear 50. In the embodiment shown, the actuator 56 is configured to disconnect the inner shaft 48 from one of the first and second planetary gear-sets 332-1, 332-2. Specifically, as shown in FIG. 4, the actuator 56 may be arranged in operative connection with the idler gear 50 and include a solenoid 56A configured to shift the idler gear into meshed engagement with each of the first member 42 and the inner shaft 48. Alternatively, the actuator 56 may be arranged in operative connection with the idler gear 50 to act as a clutch configured to impede or prevent rotation of the idler gear.

As shown in FIG. 4, the first axle-shaft 28-1 is continuously connected to the second member 44 of the first planetary gear-set 332-1. Similarly, the second axle-shaft 28-2 is continuously connected to the second member 44 of the second planetary gear-set 332-2. Similar to the embodiment of FIG. 3, in each of the first and second gear-sets 332-1, 332-2, the first member 42 may be a ring gear, the second member 44 may be a planetary carrier supporting a plurality of pinion gears 58 in mesh with the first and second members, and the third member 46 may be a sun gear, as understood by those skilled in the art.

As shown in FIG. 1, the vehicle 10 also includes a programmable controller 60 configured to achieve desired propulsion of the vehicle 10 in response to command(s) from an operator of the subject vehicle. Specifically, the controller 60 may be programmed to regulate and coordinate operation of the first power-source, such as the internal combustion engine 12, and the final drive assembly 30. Accordingly, the controller 60 may control the operation of the motor-generator 22, as well as the actuator 56, to appropriately transmit drive torque T2 to the first and second axle-shafts 28-1, 28-2. To accomplish the above, the controller 64 may include a processor and tangible, non-transitory memory, which includes instructions for operation of the final drive assembly 30 programmed therein. The memory may be any recordable medium that participates in providing computer-readable data or process instructions. Such a recordable medium may take many forms, including but not limited to non-volatile media and volatile media.

Non-volatile media for the controller 60 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 60 may also include a floppy disk, a flexible disk, hard disk, magnetic tape, any other magnetic medium, a CD-ROM, DVD, any other optical medium, etc. The controller 60 may be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 60 or accessible thereby may be stored in the memory and automatically executed to provide the required functionality of the final drive assembly 30.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A final drive assembly for a vehicle drive axle having first and second axle-shafts that are configured to rotate about a common first axis, the final drive assembly comprising:
    a first gear-set configured to be operatively connected to the first axle-shaft;
    a second gear-set configured to be operatively connected to the second axle-shaft;
    an electric motor configured to provide an electric motor torque input to each of the first and second gear-sets and arranged on a second axis that is parallel to the first axis;
    a first differential shaft operatively connected to the first gear-set and a second differential shaft operatively connected to the second gear-set;
    a differential third gear-set operatively connecting the electric motor to the first and second differential shafts; and
    first and second axle gear members arranged to rotate about the first axis and operatively connected to the respective first and second axle-shafts;
    wherein:
        the first and second gear-sets are configured as first and second parallel-shaft transfer gear-sets, respectively;
        the first parallel-shaft transfer gear-set is operatively connected to the first differential shaft and the second parallel-shaft transfer gear-set is operatively connected to the second differential shaft;
        each of the first and second parallel-shaft transfer gear-sets includes respective first and second intermediate gears arranged to rotate about a third axis that is parallel to each of the first and second axes; and
        the first and second intermediate gears transfer torque from the respective first and second differential shafts to the respective first and second axle-shafts via the respective axle gear members.

2. The final drive assembly according to claim 1, further comprising a final drive housing, wherein the electric motor includes a stator fixed to the final drive housing and a rotor configured to transfer the electric motor torque input to the differential third gear-set.

3. The final drive assembly according to claim 1, wherein:
    each of the first and second differential shafts includes one of a respective splined end and an attached gear; and
    each of the one of the respective splined end and the attached gear is configured to transfer torque from the respective first and second differential shafts to the respective first and second axle-shafts.

4. A vehicle drive axle comprising:
    a first road wheel and a second road wheel;
    a first axle-shaft operatively connected to the first road wheel and a second axle-shaft operatively connected to the second road wheel, wherein each of the first and second axle-shafts is configured to rotate about a common first axis; and
    a final drive assembly configured to transmit a drive torque to the first and second axle-shafts, the final drive assembly including:
        a first gear-set operatively connected to the first axle-shaft;
        a second gear-set operatively connected to the second axle-shaft;
        an electric motor configured to provide the drive torque input to each of the first and second gear-sets and arranged on a second axis that is parallel to the first axis;
        a first differential shaft operatively connected to the first gear-set and a second differential shaft operatively connected to the second gear-set;
        a differential third gear-set operatively connecting the electric motor to the first and second differential shafts; and
        first and second axle gear members arranged to rotate about the first axis and operatively connected to the respective first and second axle-shafts;
    wherein:
        the first and second gear-sets are configured as first and second parallel-shaft transfer gear-sets, respectively;
        the first parallel-shaft transfer gear-set is operatively connected to the first differential shaft and the second parallel-shaft transfer gear-set is operatively connected to the second differential shaft;
        each of the first and second parallel-shaft transfer gear-sets includes respective first and second intermediate gears arranged to rotate about a third axis that is parallel to each of the first and second axes; and
        the first and second intermediate gears transfer torque from the respective first and second differential shafts to the respective first and second axle-shafts via the respective axle gear members.

5. The vehicle drive axle according to claim 4, wherein the final drive assembly additionally includes a final drive housing, and wherein the electric motor includes a stator fixed to the final drive housing and a rotor configured to transfer the electric motor torque input to the differential third gear-set.

6. The vehicle drive axle according to claim 4, wherein:
    each of the first and second differential shafts includes one of a respective splined end and an attached gear; and
    each of the one of the respective splined end and the attached gear is configured to transfer torque from the respective first and second differential shafts to the respective first and second axle-shafts.

* * * * *